United States Patent [19]

Regitz

[11] 3,742,465

[45] June 26, 1973

[54] ELECTRONIC MEMORY STORAGE ELEMENT

[75] Inventor: William M. Regitz, Franklin, Mass.

[73] Assignee: Honeywell Inc., Minneapolis, Minn.

[22] Filed: Nov. 4, 1971

[21] Appl. No.: 196,305

Related U.S. Application Data

[63] Continuation of Ser. No. 808,421, March 19, 1969, abandoned.

[52] U.S. Cl. ........... 340/173 CA, 307/279, 307/238

[51] Int. Cl. ........................ G11c 11/40, G11c 11/24

[58] Field of Search ................. 340/173 R, 173 CA; 307/238, 279

[56] References Cited

UNITED STATES PATENTS

| | | | |
|---|---|---|---|
| 3,480,796 | 11/1969 | Polkinghorn et al. | 340/173 |
| 3,599,180 | 8/1971 | Rubinstein et al. | 340/173 |
| 3,593,037 | 7/1971 | Hoff, Jr. | 340/173 |
| 3,585,613 | 6/1971 | Palfi | 340/173 |

*Primary Examiner*—Stanley M. Urynowicz, Jr.
*Attorney*—Ronald T. Reiling et al.

[57] ABSTRACT

Herein is revealed an electronic memory element that employs transistors preferably of the MOS (metal oxide semiconductor) field effect type. The fundamental memory element, which is primarily for use in a random access memory array, includes three MOS field effect transistors arranged to provide for the binary storage of data. Two additional MOS transistors stabilize the voltages on the bit lines and amplify the read signal. Also disclosed is a sense amplifier, operable during a read cycle, and a digit driver operable during a write cycle, both of which can be of conventional design.

29 Claims, 5 Drawing Figures

INVENTOR
WILLIAM M. REGITZ

BY Fred Jacob

ATTORNEY

Patented June 26, 1973 3,742,465

3 Sheets-Sheet 2

INVENTOR
WILLIAM M. REGITZ

BY Fred Jacob

ATTORNEY

ELECTRONIC MEMORY STORAGE ELEMENT

This is a continuation of application Ser. No. 808,421, filed Mar. 19, 1969, now abandoned.

BACKGROUND AND OBJECTS OF THE INVENTION

The present invention pertains generally to electronic memory storage devices and more particularly to random access memory elements (cells) that employ transistors, preferably of the field effect type.

In the past, many memory systems used magnetic cores as the prime storage element, along with the necessary drivers and amplifiers that constitute a complete system. In one such system, X drivers and Y drivers were used to switch selected cores while digit drivers and sense amplifiers functioned, respectively, during the write and read cycles of operation. With the advent of miniature integrated circuits, however, attention is being directed to fabricating memory systems using large scale integration techniques in lieu of discrete-type core memories. Some advantages recognized by using these techniques instead of core memories are: higher operating speeds, lower power consumption, lower sensitivity to temperature variation, and lower cost.

Heretofore, such integrated circuit memory cells achieved only limited realization of these advantages. In particular, prior electronic memory cells require a considerable number of transistors per cell and hence provide only limited savings in cost and size. Further, the prior cells require a relatively large number of external connections.

Therefore, it is the purpose of the present invention to provide a transistorized memory element that can be fabricated by known integration techniques and that includes only three transistors in the fundamental cell configuration. The memory element is further characterized in that it is capable of non-destruct readout operation, operates at a relatively low power level and is quite inexpensive to fabricate.

In order to furnish the aforementioned advantages, it is an object of the present invention to provide a memory element having a minimum number of transistors, preferably of the MOS (metal oxide semiconductor) field effect type.

It is also an object of this invention to provide a memory element that can be easily and economically fabricated, particularly in an array configuration.

It is another object of the present invention to provide a memory element that is capable of non-destruct readout and that further operates at a low power level.

It is still another object of the present invention to provide a memory cell of the above character which requires a minimal number of leads for connection to external circuitry, thereby facilitating fabrication in a cell array.

These and other objects will become apparent from the following summary and detailed description of the present invention.

SUMMARY OF THE INVENTION

The purposes and objects of the present invention are satisfied by providing a storage cell including three transistors, preferably of the MOS field efect type or of a type that displays similar characteristics. Structurally, in an illustrative embodiment of the invention the third drain electrode of a first transistor and first gate electrode of a second transistor are coupled to a data node which is capable of storing data because of the inherent capacitances associated with these transistors. The fundamental cell further includes a third transistor serially connected with the second transistor, between a reference potential and a first bit line. The second electrode of the first transistor is coupled to a second bit line whereas the first gate electrodes of the first and third transistors are coupled to an external selection line. In operation, when a selection signal is present on the selection line, data can be written into and retrieved from the memory cell via the bit lines. A tri-level selection signal operates the cell effectively as discussed hereinafter and provides for a minimal number of connections to external circuitry.

The electronic memory cell can include two additional transistors connected between the bit lines and to a digit/sense terminal. These two additional transistors stabilize the voltages on the bit lines and amplify the output read signal. The digit/sense terminal is coupled to external circuitry which includes a sense amplifier for reading data stored in the memory cell and a digit driver for writing data into the cell.

The advantages of the foregoing configuration of the present invention will become more apparent upon reading the accompanying detailed description in connection with the drawings, in which.

DETAILED DESCRIPTION

Figure 1:
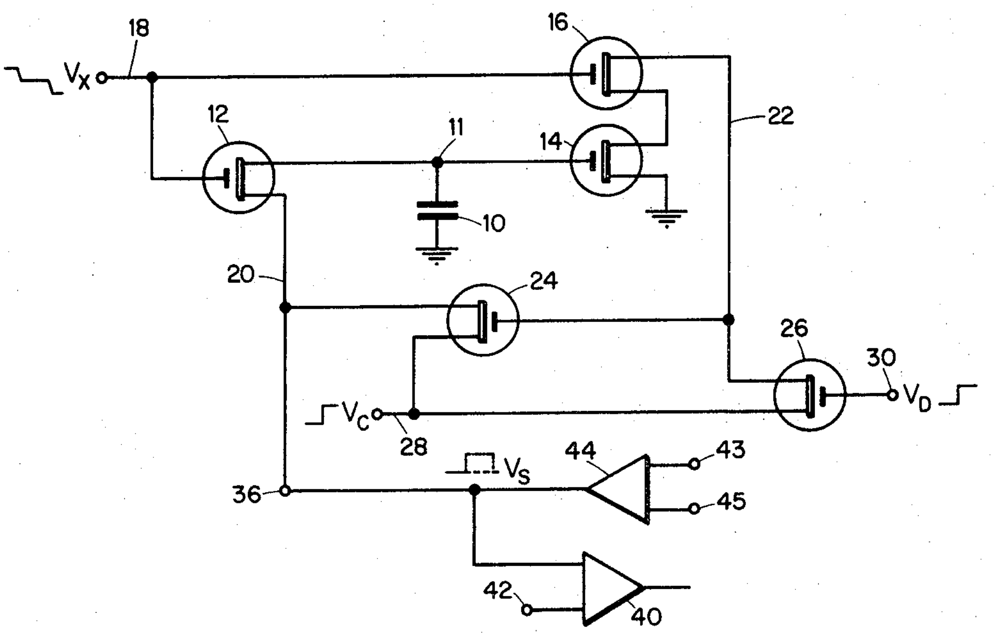
FIG. 1 is a circuit diagram showing a memory cell in accordance with the principles of the present invention.

Although it is not contemplated that the present invention be limited to particular types of transistors, illustratively, the memory element depicted in FIG. 1 employs p-channel MOS (metal oxide semiconductor) field effect transistors. Such transistors can be fabricated in the following manner.

Two p-type regions are formed within an n-type silicon substrate by a diffusion process. These two p-type regions are then bridged by means of a metal gate insulated from the substrate by a silicon oxide film grown on the surface of the substrate. A lead is brought out from each p-type region, one lead being referred to as the drain electrode and the other being referred to as the source electrode. The remaining terminal, which is connected to the metal gate, is referred to as the gate electrode.

The characteristics of such p-channel devices are that the impedance between the drain and source electrodes is regulated by the voltage at the gate electrode relative to the voltage at the other electrode. This voltage impressed on the gate electrode, therefore, determines the value of current flowing between the drain and source when a fixed voltage is applied between the drain and source electrodes. For example, if the source is grounded and the drain is at a negative voltage, a current commences to flow between the drain and source electrodes when the gate voltage exceeds a negative value commonly referred to as the threshold voltage and ordinarily designated by the symbol $V_T$. A typical value of $V_T$ is between 3 and 4 volts. Such a p-channel device that operates in the above manner is termed an enhancement type MOS field effect transistor. Also contemplated as falling within the scope of the present invention are depletion type transistors characterized in that conduction ceases when the gate-to-source voltage exceeds a threshold value $V_T$.

FIG. 1 shows a preferred embodiment of a single storage cell according to the present invention and which includes MOS transistors 12, 14 and 16. Structurally, the connections are as shown in FIG. 1. More specifically, the gate electrodes of transistors 12 and 16 are connected to selection line 18, while the source electrodes of transistors 12, 14 and 16 are, respectively, connected to bit line 20, to a ground reference potential and to the drain electrode of transistor 14. The drain electrode of transistor 16 is connected to bit line 22, while the drain electrode of transistor 12 and the gate electrode of transistor 14 are connected to data node 11.

This three-transistor arrangement stores binary data in the form of the potential across capacitor 10 or, in other words, the voltage existing at data node 11. Actually, the physical presence of capacitor 10 is optional because, for most applications the inherent, internal capacitance of transistors 12 and 14 that can be considered as associated with data node 11 is sufficient to store the data. Information can be considered as being stored in the node capacitance of the drain and gate connections of transistor 12 and transistor 14, respectively. Accordingly, one integrated circuit embodiment has no separate capacitor 10.

FIG. 1 further shows transistors 24 and 26 connected essentially between bit lines 20 and 22. The gate electrodes of transistors 24 and 26 are coupled, respectively, to bit line 22 and control terminal 30. The drain electrode of transistor 24 is connected to bit line 20 while the source electrodes of transistors 24 and 26 connect to control terminal 28. The two remaining connections are from the drain electrode of transistor 26 to bit line 22 and from bit line 20 to digit/sense terminal 36.

Figure 3:
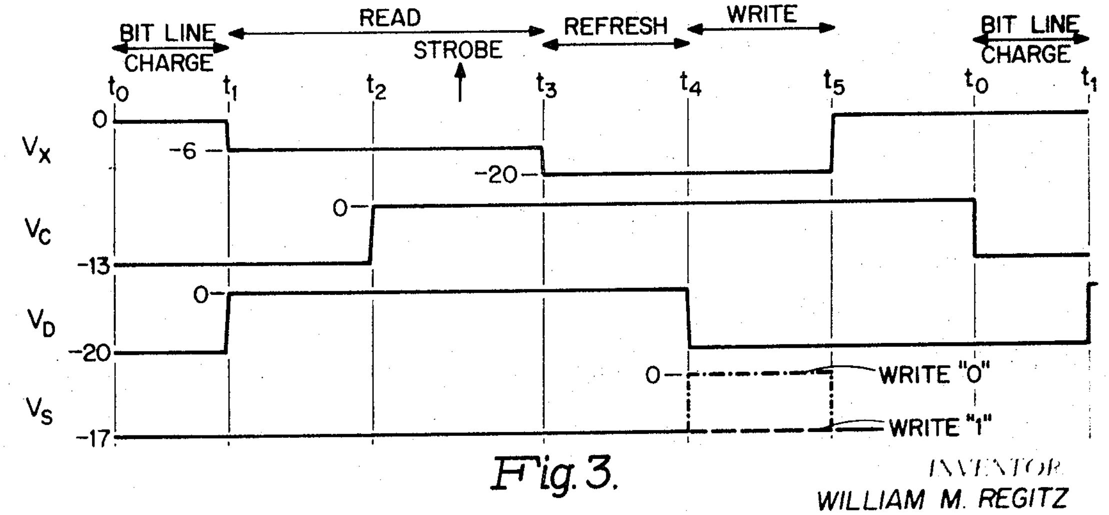
FIG. 3 is a timing diagram illustrating the operation of the memory cell of FIG. 1.
Figure 4:
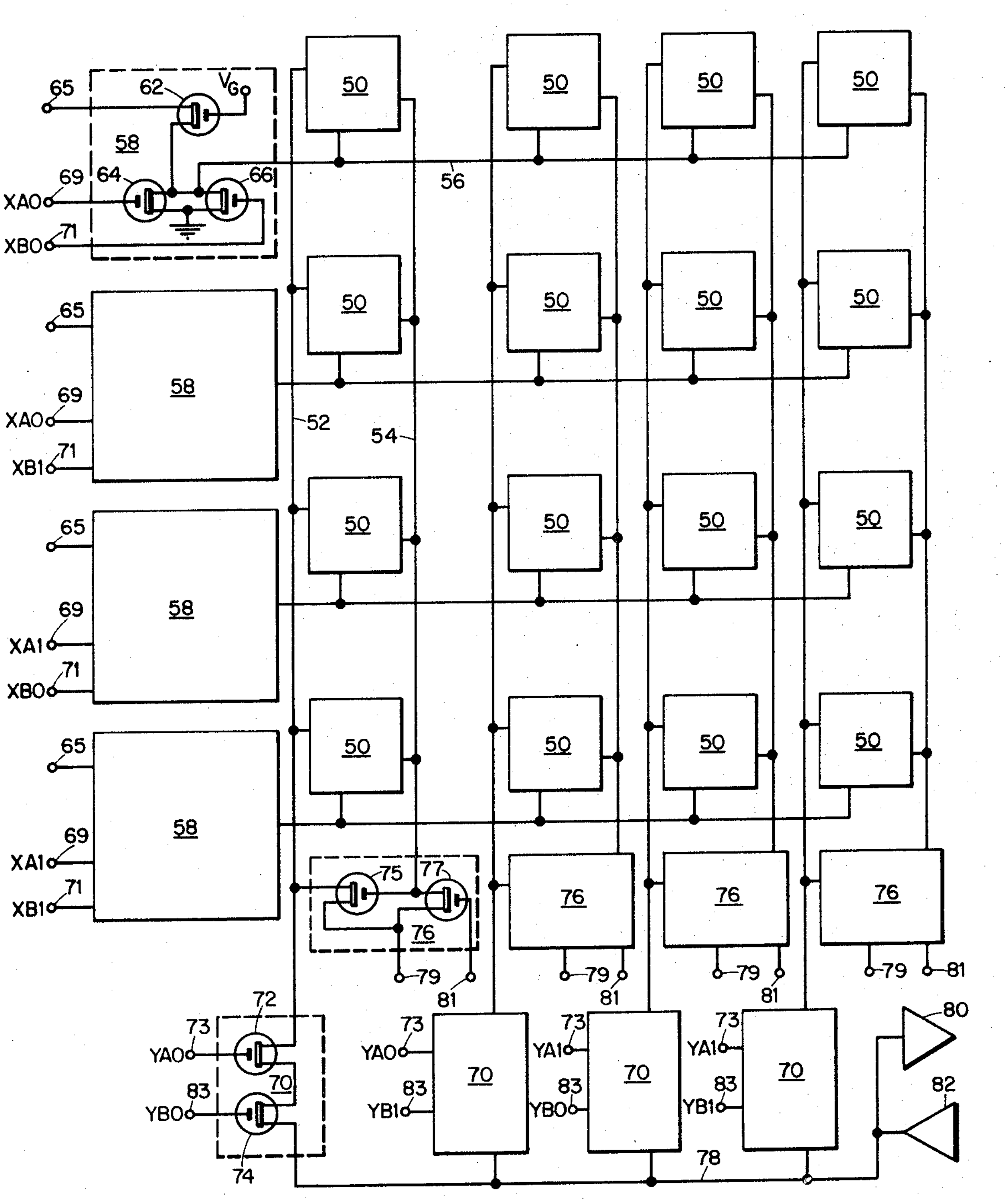
FIG. 4 is a schematic diagram of an array of memory cells according to FIG. 1 and the additional circuitry associated therewith.

Although the memory element of FIG. 1 would normally find use in an array configuration as shown in FIG. 4, its operation can be explained with reference to FIGS. 1 and 3. FIG. 3 is a timing diagram of externally-produced operating voltages that are applied to the memory element during a read-refresh-write cycle. The voltage $V_X$ is applied to selection line 18 while the voltages $V_C$ and $V_D$ are applied, respectively, to control terminal 28 and control terminal 30. In addition, digit/-sense terminal 36 has connected thereto a sense amplifier 40 and a digit driver 44, both of which can be of conventional construction. A separate control unit actuates the digit driver 44 for operation only during the write operation, and actuates the sense amplifier 40 for operation only during the read operation.

Referring to FIGS. 1 and 3, the time period $t_0 - t_1$, which precedes the read operation, can be referred to as the normal or standby state of operation. During this time interval the voltages on bit lines 20 and 22 are stabilized, without affecting the storage of data. As previously mentioned, the potential existing at node 11 determines the binary data state. In the illustrated embodiment of FIG. 1, a voltage at node 11 less than the threshold voltage of transistor 14 is referred to as a ZERO while a node voltage greater than the threshold voltage is referred to as a ONE. For example, with the illustrated operating voltages, a voltage at node 11 of −2 volts is termed a ZERO whereas a voltage of −12 volts is termed a ONE.

During the $t_0 - t_1$ interval, the voltage $V_X$ at selection line 18 is at ground potential, control terminal 28 voltage $V_C$ is at −13 volts, and control terminal 30 voltage $V_D$ is at −20 volts. In addition, the digit driver is operated to constrain the terminal 36 voltage $V_S$ at −17 volts. With these voltages, transistor 26 conducts thereby establishing a voltage of approximately −13 volts on bit line 22. However, transistor 24 is nonconductive and hence the voltage on bit line 20 assumes a value of $V_S$, −17 volts. In this condition, transistors 24 and 26 are designated as stabilizing the bit line voltages. Transistors 12, 14 and 16 are nonconductive and the voltage at data node 11 remains relatively unchanged from the value determined by the previous write operation.

A read operation commences at time $t_1$ and terminates at time $t_3$. During this time interval, $V_X$ assumes a value between $V_T$ and 2 $V_T$; −6 volts, for example. $B_D$ goes to ground turning off transistor 26, while $V_C$ remains at −13 volts. If it is assumed that the memory cell contains a binary ONE, node 11 is at approximately −12 volts. The gate voltage of transistor 12 is not sufficiently negative to turn transistor 12 on, however, this gate voltage which is also applied to the gate electrode of transistor 16 is sufficiently negative to turn transistor 16 on. The negative voltage at node 11 also renders transistor 14 conductive. The conduction of transistors 14 and 16 causes bit line 22 to discharge toward ground. $V_C$, which remains at −13 volts until time $t_2$, keeps transistor 24 off until bit line 22 discharges. At time $t_2$, $V_C$ goes to ground but with approximately zero volts on bit line 22, transistor 24 remains off. For a read ONE operation, therefore, sense amplifier 40 is strobed (activated) by applying an appropriate pulse to terminal 42 during interval $t_2 - t_3$ and no current is sensed because transistors 12 and 24 are off.

This lack of a read current is by definition indicative of a ONE storage. It is also noted that this readout is non-destructive because the voltage at node 11 remains stable even when transistors 14 and 16 are conducting.

If it is assumed that a read ZERO is to be performed, the following occurs during time $t_1$ to $t_3$. With data node 11 storing a ZERO and hence near ground potential at, for example, −2 volts, the −6 volt $V_X$ signal applied to selection line 18 may render transistor 12 temporarily conductive in the reverse direction for a fraction of the time interval until the drain to gate voltage difference drops to less than $V_T$. The slight negative voltage at data node 11 is not sufficient, however, to cause conduction of transistor 14. Without the signal path to ground provided by transistor 14, transistor 16 is not rendered conductive and bit line 22 remains at approximately −13 volts. In observing the $V_C$ waveform of FIG. 3 at time $t_2$, the voltage applied to control terminal 28 goes to ground. With bit line 22 at −13 volts and the source electrode of transistor 24 grounded, transistor 24 is rendered conductive and draws read current from its drain to its grounded source electrode. As previously mentioned, sense amplifier 40 is activated by applying a strobe pulse to terminal 42 between time $t_2$ and time $t_3$. For a read ZERO operation, therefore, the amplifier senses a current via the drain electrode of transistor 24. This sensed current is by definition indicative of a ZERO storage. Further, such read out is a non-destruct readout because, with line 18 at −6 volts, node 11 does not go any more negative than approximately $V_T$.

Since the data is stored on an imperfect capacitor, it is refreshed at a rate determined by: the leakage current of a reverse-biased diode (drain of transistor 12); the gate leakage resistance of transistor 14; the value of the capacitor; and the allowable voltage swing. Accordingly, a refresh cycle, which reassures that the voltage at node 11 correctly reflects the state of the memory cell, occurs during the time interval $t_3 - t_4$. As previously mentioned, with the illustrated circuit, a voltage around ground represents a ZERO and a voltage greater than $V_T$ (−4 volts) represents a ONE. Obviously, voltages in the area of −12 volts define a good ONE while voltages in the area of −5 volts define a poor ONE. Likewise, a voltage of −1 volt is indicative of a good ZERO and −3 volts is a poor ZERO. It is the purpose of the refresh cycle to interpret a poor data state and substitute a good data state for it. This is accomplished by changing the voltage $V_X$ from −6 volts to −20 volts at time $t_3$. Assume that capacitor 10 is supposed to be storing a ONE but is charged to only −5 volts. When the voltage on the gate electrode of transistor 12 goes to −20 volts, transistor 12 conducts in the reverse direction forcing the voltage at node 11 toward the voltage on bit line 20 to which driver 44 is applying −17 volts as shown in FIG. 3. Capacitor 10 is then storing a good ONE On the other hand, when the voltage at node 11 identifies a ZERO storage during a refresh interval, with the bit line 20 at approximately ground potential due to transistor 24 conducting, transistor 12 conducts and constrains the voltage across capacitor 10 to near ground, which is a good ZERO.

From time $t_4$ to time $t_5$ the writing of information occurs. During this interval the voltage $V_X$ applied to selection line 18 remains at −20 volts and the voltage $V_C$ remains at ground. The voltage $V_D$ applied to the gate electrode of transistor 26 goes to −20 volts while digit driver 44 applies to digit/sense terminal 36 a voltage which is dependent upon whether one desires to write a ONE or ZERO. The writing of a ZERO occurs when a ground potential is applied to digit/sense terminal 36 while the writing of a ONE occurs when a −20 volt level is applied to terminal 36. In operation, with control terminal 28 at ground potential and control terminal 30 at −20 volts, transistor 26 is rendered conductive for a brief instant until line 22 is discharged toward ground, which turns off transistor 24. With bit line 22 near ground, transistors 14 and 16 are essentially nonconductive.

Digit driver 44 has a ONE input 43, activated to write a ONE into the cell and a ZERO input 45, activated to write a ZERO into the cell. When input 43 is selected, during a write interval, digit driver 44 impresses −17 volts on terminal 36 and node 11 is charged through conducting transistor 12 to a negative voltage indicative of a ONE storage (−15 volts, for example). Likewise, when input 45 is selected, digit driver 44 impresses zero volts on terminal 36 and node 11 is charged, again through transistor 12, to essentially ground potential which is indicative of a ZERO storage.

Thus, by way of review, the FIG. 1 memory cell can be considered as having two transistors 14 and 16 arranged in an AND configuration; the storage node 11 provides one input for this AND configuration and the selection line 18 provides the other input. When the selection line 18 is negative, as during a read operation and during a refresh operation, transistor 16 is rendered capable of conduction. However, it only conducts when, at the same time, storage node 11 is at the negative voltage corresponding to a ONE and transistor 14 is rendered conductive. When both transistors 14 and 16 conduct, they discharge the bit line 22 toward ground. (Transistor 26 recharges bit line 22 to a negative voltage during each bit line charge interval.)

Transistor 24 senses the voltage on bit line 22 at its gate. Accordingly, during a read operation, when a ZERO is stored and hence transistors 14 and 16 do not conduct so that bit line 22 is negative, transistor 24 conducts and draws read current. The converse occurs during the read of a stored ONE. Similarly, during a refresh operation, transistor 24 conducts when a ZERO is stored. This conduction discharges bit line 20 so that node 11 is restored to the near-ground level desired for storing a ZERO. Transistor 24 does not respond to the bit line 22 voltage during a bit line charge interval, because a negative control voltage constrains the transistor to be nonconducting. This allows the second bit line 20 to assume a negative voltage.

Transistors 14 and 16, as well as transistors 24 and 26, are not used during a write operation except that a control voltage $V_C$ applied to transistor 26 prevents significant conduction of transistors 14 and 16.

Transistor 12 operates during write and refresh operations in response to the voltage on bit line 20 and the selection line voltage. For this operation, the selection voltage causes transistor 12 to conduct during both these intervals, thereby coupling the bit line 20 to the storage node 11. Hence the capacitance associated with the node is charged in accordance with the bit line 20 voltage, which in turn corresponds to the binary value that is to be stored.

The storage cell operates with a selection control voltage having one of three values. During a bit line charged interval, the selection voltage has a value, illustratively ground, that maintains the three transistors in the fundamental cell non-conducting. During write and refresh operations, the selection voltage has a relatively large negative value that biases both transistors 12 and 16 for conduction. However, during read operations, the selection voltage has a value intermediate the other values and sufficient to enable transistor 16 for conduction but not sufficient to hold transistor 12 on.

Figure 5:
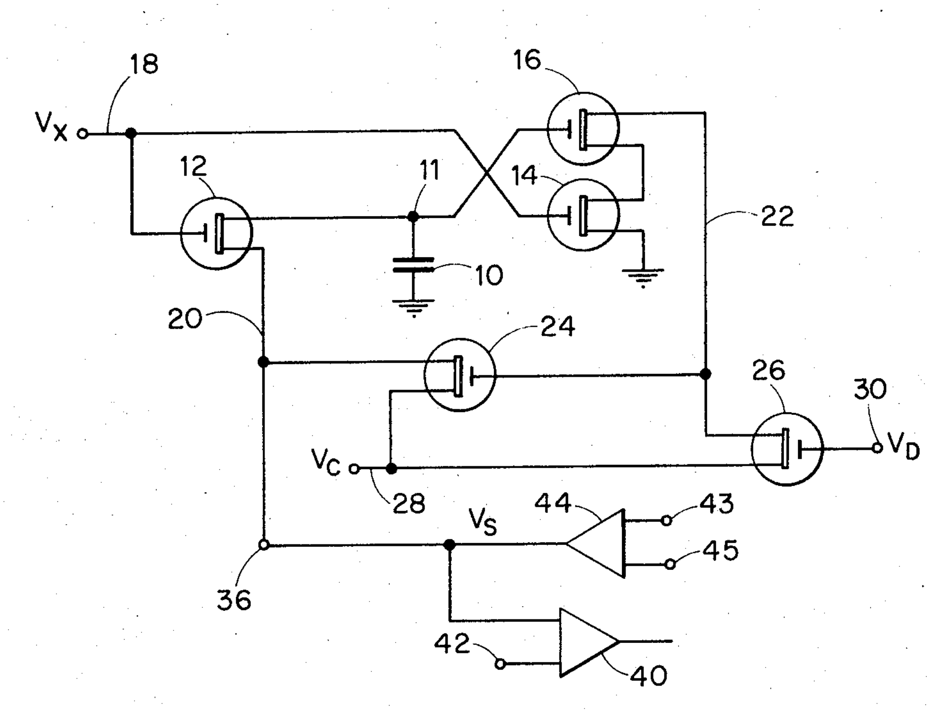
FIG. 5 is a circuit diagram showing a further embodiment of a memory cell in accordance with the principles of the present invention.

It should be noted that three transistors 12, 14 and 16 which form the fundamental cell can be arranged, alternative to the illustrated embodiment, with transistors 14 and 16 essentially interchanged, as shown in FIG. 5. That is, the fundamental cell can be constructed with transistor 12 arranged as shown with its drain connected to node 11, with the gate of transistor 14 connected to the selection line 18, and with the gate of transistor 16 connected to the node 11. The source and drain paths of transistor 14 and 16 are still in series with each other between ground and the bit line 22, as in FIG. 1. This alternative arrangement of the cell operates in the same manner as the FIG. 1 cell.

Figure 2:
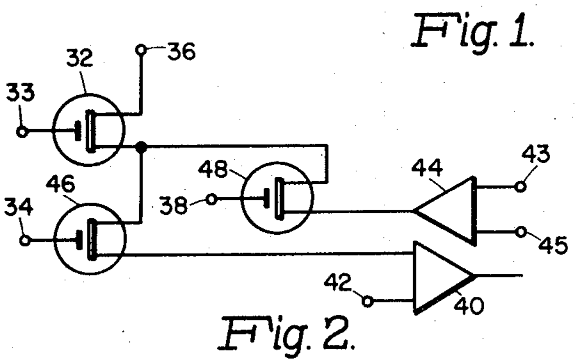
FIG. 2 is a circuit diagram showing an addendum to the memory cell of FIG. 1.

FIG. 2 shows three transistors 32, 46 and 48 that can be added to the memory cell of FIG. 1 to isolate the sense amplifier 40 and the digit driver 44 from each other and, except when the amplifier of driver is to be operated, from the digit/sense terminal 36. In particular, the drain electrode of transistor 32 is connected to the terminal 36, and the source electrode is connected to the drain electrodes of transistors 46 and 48. The source electrode of transistor 46 is connected to amplifier 40, and driver 44 is connected to the source electrode of transistor 48.

A negative signal applied to the gate 33 of transistor 32 turns that transistor on to provide a signal path from the digit/sense terminal 36 to the drain electrodes of transistors 46 and 48. A negative signal applied during this time to the gate 34 of transistor 46 couples the sense amplifier to the terminal 36 for a read operation. Alternatively, during a write operation, a negative signal is applied to gate 38 of transistor 48 to couple the digit driver 44 to terminal 36. However, when transistor 46 is nonconductive, the amplifier 40 is isolated from the remainder of the circuit; and when transistor 48 is non-conducting, the driver 44 is isolated. The transistor 32 functions when the cell is incorporated in an array of cells as described below with reference to FIG. 4.

FIG. 4 shows an illustrative use of the memory cell of FIG. 1 in a matrix arrangement with like memory cells; each being represented as a block having the reference numeral 50. Each cell 50 includes the fundamental cell of FIG. 1 formed with the three transistors 12, 14 and 16. The two transistors 24 and 26 of FIG. 1 are arranged in the array of FIG. 4 as a single bit sense circuit 76 connected to all the cells 50 in a column thereof. The matrix also has X-selection circuits 58, Y-selection circuits 70, a sense amplifier 80, a digit driver 82 and internal bit sense circuits 76. The activation of an X-selection circuit selects the horizontal row of cells connected to it, whereas the activation of a Y-selection circuit selects a vertical column of cells. Internal bit sense circuit 76 functions in a manner analagous to the transistors 24 and 26 shown in FIG. 1.

Each illustrated X-selection circuit 58 which receives a different pair of XA and XB selection signals, includes MOS transistors 62, 64 and 66. Transistors 64 and 66 have their source electrodes connected in common to a ground reference potential, their drain electrodes connected in common to the source electrode of transistor 62 and their gate electrodes connected, respectively, to logic input terminals 69 and 71 of the array. The gate electrode of transistor 62 connects to a voltage designated as $V_G$ (−20 volts, for example), whereas the drain electrode of transistor 62 connects to tri-level input 65. The output from X-selection circuit 58 connects from the drain electrodes of transistors 64 and 66 to X-selection line 56. Input terminal 65 has a tri-level signal applied thereto that assists in controlling the read-refresh-write sequence.

The input terminals 69, 71 provide for logical selection of any one X-selection circuit in the matrix; for the X-selection circuit shown schematically in detail in FIG. 4 these inputs are designated XAO and XBO. When both XAO and XBO inputs go to ground potential, transistors 64 and 66 are rendered non-conductive. With a negative voltage on the gate electrode of transistor 62, it conducts and the potential applied to tri-level input 65 is coupled to X-selection line 56. This action selects the top horizontal row of cells, and one cell in that row will be operated upon depending on which Y-selection circuit is activated.

FIG. 4 also illustrates a Y-selection circuit 70 that includes transistors 72 and 74. These two transistors are serially connected, with the source electrode of transistor 72 connected to the drain electrode of transistor 74. The gate electrodes of transistors 72 and 74 connect to logic input terminals 73, 83. The drain electrode of transistor 72 connects to bit line 52 and the source electrode of transistor 74 to digit line 78. For the Y-selection circuit shown schematically in detail in FIG. 4, the inputs are designated YAO and YBO. When both YAO and YBO inputs go to −20 volts, transistors 72 and 74 are rendered conductive thereby connecting bit line 52 to digit line 78. This action selects only the leftmost vertical column of cells, and when the XAO and XBO signals are present only the uppermost cell in that column will operate. In like manner, various other logic inputs at terminals 73, 83 and 69, 71 select one of the 16 memory cells shown in FIG. 4.

Internal bit sense circuit 76 includes transistors 75 and 77 connected in the same manner as transistors 24 and 26 respectively of FIG. 1. Control voltages are applied to terminals 79 and 81 in a manner similar to the application of voltages $V_C$ and $V_D$ respectively in FIG. 1. The purpose of internal bit sense circuit 76 is to amplify the read current during a read operation and to stabilize the bit lines prior to a read operation.

During the time interval $t_0 - t_1$ (FIG. 3), $V_C$ is at −13 volts and $V_D$ is at −20 volts. As this applies to FIG. 4, terminal 79 would be at −13 volts and terminal 81 at −20 volts, thereby rendering transistor 77 temporarily conductive. This action stabilizes the voltages on bit lines 52 and 54 to, respectively, −17 volts and −13 volts. During the subsequent read operation if the cell is storing a ZERO, bit line 54 remains at −13 volts, transistor 75 conducts via transistors 72 and 74 and digit line 78, and sense amplifier 80, when strobed, detects a read current.

For a write operation, digit driver 82 is selected and either a ONE or ZERO voltage level is impressed on bit line 52 via transistors 72 and 74.

As previously mentioned, the refresh cycle interprets a poor data state and substitutes therefor a good data state. With the embodiment of FIG. 4, the refresh operation occurs every memory cycle and refreshes a single horizontal row of cells. During this refresh operation all Y-logic inputs 73, 83 are selected, along with an X-logic input (XAO and XBO, for example). The tri-level input signal applied to terminal 65 assumes its most negative level (−20 volts) after the voltages on bit lines 52, 54 are stabilized. If a particular cell is storing a ONE, bit lines 52, 54 are, respectively, at −17 volts and ground. During a refresh the −17 volts on bit line 52 forces the cell to contain a good ONE. Similarly, if a particular cell in storing a ZERO, bit lines 52, 54 are respectively, substantially at ground and −13 volts. During a ZERO refresh, therefore, the ground on bit line 52 forces the cell to contain a good ZERO.

In FIG. 4, as in FIG. 1, sense amplifier 80 can be of conventional design and operates functionally to sense current flowing in digit line 78. Digit driver 82 can also be of conventional design and operates during a write cycle to write a ONE or ZERO into a selected cell.

From the foregoing discussion, it is seen that the advantages and objects of the present invention are readily attained. The present memory element provides a storage means having a minimum number of transistors. The cell also operates with a non-destruct read, and at low power levels. Further, the use of tri-level input signals reduces the number of leads from the cells, thereby facilitating fabrication thereof.

It should further be understood that a memory element employing the principles of FIG. 1 may be modified in a variety of ways. The preceding description has been of a preferred embodiment of the present invention. Various changes and modifications will be apparent to those skilled in the art. Therefore, this invention is to be interpreted, not by the specific disclosure herein, but only in view of the appended claims.

Having now described the invention, what is claimed as new and for which it is desired to secure by Letters Patent is:

1. An electronic memory storage element for connection to a pair of bit lines and at least one selection line and adapted to be coupled to a sense amplifier during a read interval and a digit driver during a write interval, said element comprising:

a. a first transistor having first, second and third electrodes, wherein said first electrode is directly coupled to said selection line, said second electrode is coupled to one of said bit lines and said third electrode is coupled to a common storage node;

b. a second transistor having first, second and third electrodes, wherein said first electrode is coupled to said common storage node and said second electrode is coupled to a common reference potential; and c. a third transistor having first, second and third electrodes, wherein said first electrode is directly coupled to said selection line, said second electrode is coupled to the third electrode of said second transistor and said third electrode is coupled to the other of said bit lines and wherein the inherent capacitance associated with said common storage node is capable of assuming two voltage ranges each indicative of a binary state of data.

2. An electronic memory storage element for connection to a pair of bit lines and at least one selection line and adapted to be coupled to a sense amplifier during a read interval and a digit driver during a write interval, said element comprising:

a. a first transistor having first, second and third electrodes, wherein said first electrode is directly coupled to said selection line, said second electrode is coupled to one of said bit lines and said third electrode is coupled to a common storage node;

b. a second transistor having first, second and third electrodes, wherein said first electrode is coupled to said common storage node and said third electrode is coupled to the other of said bit lines; and c. a third transistor having first, second and third electrodes, wherein said first electrode is directly coupled to said selection line, said second electrode is coupled to a common reference potential and said third electrode is coupled to the second electrode of said second transistor and wherein the inherent capacitance associated with said common storage node is capable of assuming two voltage ranges each indicative of a binary state of data.

3. A random access electronic memory having plural memory cells arranged in a matrix configuration in rows and columns, each of which stores one binary bit of data and further including a sense amplifier, and digit driver commonly connected to a digit/sense line, said memory comprising:

a. a pair of bit lines connected to each memory cell in each column;

b. a selection line per row, connected to each memory cell in each row;

c. a row selection circuit coupled to the respective selection line to logically select a particular row of cells;

d. internal bit sense circuit means connected to said bit lines for stabilizing the voltages on said bit lines prior to a read interval including further means for amplifying a current in at least one bit line during a read interval; and e. column selection circuit means connected to said interval bit sense circuit means for logically selecting a particular column of cells and including further means for providing connection between said internal bit sense circuit and said digit/sense line.

4. An electronic memory storage element including a common storage node and a selection line, wherein said selection line is one of several selection lines in an array of said storage elements, said element comprising:

a. a first transistor having first, second and third electrodes, wherein said first electrode is directly coupled to said selection line and said third electrode is connected to said common storage node;

b. a second transistor having first, second and third electrodes, wherein said first electrode is coupled to said common storage node and said second electrode is coupled to a common reference potential; and c. a third transistor having first, second and third electrodes, wherein said first electrode is directly coupled to said selection line and said second electrode is coupled to the third electrode of said second transistor.

5. An electronic memory storage element including a common storage node and a selection line, said element comprising:

a. a first transistor having first, second and third electrodes, wherein said first electrode is coupled to said selection line and said third electrode is connected to said common storage node;

b. a second transistor having first, second and third electrodes, wherein said first electrode is coupled to said common storage node; and c. a third transistor having first, second and third electrodes, wherein said first electrode is coupled to said selection line, said second electrode is coupled to a common reference potential and said third electrode is coupled to the second electrode of said second transistor.

6. A random access electronic memory having a plurality of memory cells arranged in a matrix configuration in rows and columns, each of which stores one binary bit of data and further including a sense amplifier, and digit driver commonly connected to a digit/-sense line, said memory comprising:

a. a pair of bit lines connected to each memory cell in each column;

b. a selection line per row, connected to each memory cell in each row;

c. a row selection circuit coupled to the respective selection line for logically selecting a particular row of cells;

d. internal bit sense circuit means connected to said bit lines for stabilizing the voltages on said bit lines prior to a read interval and including further means for amplifying a current in at least one bit line during a read interval;

e. column selection circuit means connected to said internal bit sense circuit means for logically selecting a particular column of cells and including further means for providing connection between said internal bit sense circuit and said digit/sense line; and wherein each cell of said memory comprises first and second terminal means for connection to said pair of bit lines, a common storage node, third terminal means for connection to the respective selection line; and a first transistor having first, second and third electrodes, wherein the first electrode is coupled to said third terminal, the second electrode is coupled to one of said bit lines and the third electrode is coupled to said common storage node; and a second transistor having first, second and third electrodes, wherein the first electrode is coupled to said common storage node; and a third transistor having first, second and third electrodes, wherein the the first electrode is coupled to said third terminal and wherein the second and third electrodes of said second and third transistors are arranged so that said second and third transistors are coupled in series between a common reference potential and the other of said bit lines, and wherein the inherent capacitance associated with said common storage node is capable of data storage.

7. An electronic memory storage apparatus that is capable of connection to a digit/sense terminal and a selection line and is further adapted to be coupled to a sense amplifier during a read interval and a digit driver during a write interval comprising:

a. a binary storage means coupled to said selection line and further including a pair of bit line terminals; and b. a first control terminal;

c. a second control terminal; and d. a pair of transistors, each having first, second and third electrodes, said transistors coupled between said bit line terminals and further coupled to said first and second control terminals and said digit/-sense terminal, said pair of transistors including first means for stabilizing the voltages at said bit line terminals prior to a read interval and second means for amplifying a current to be read by said sense amplifier during a read interval.

8. An electronic memory storage apparatus as defined in claim 7 wherein said pair of transistors are interconnected so that the first electrode of a first transistor of said pair is connected to the third electrode of the second transistor of said pair, the second electrode of said first transistor of said pair is connected to both the second electrode of said second transistor of said pair and said first control terminal, the third electrode of said first transistor of said pair is connected to one of said bit line terminals and the first electrode of said second transistor of said pair is connected to said second control terminal.

9. A memory cell for an MOS random-access integrated circuit memory which utilizes a single selection line, wherein said selection line is one of several selection lines in an array of said storage elements, said cell comprising:

a. a capacitor adaptable for storing an electrical charge;

b. a first MOS device having a gate terminal and at least two other terminals, said gate terminal directly coupled to said selection line, and one of said other terminals coupled to said capacitor;

c. a second MOS device having a gate terminal and at least two other terminals, said gate terminal coupled to said capacitor; and d. a third MOS device having a gate terminal and two other terminals, said gate terminal directly coupled to said selection line and one of said other terminals coupled to one of said other terminals of said second MOS device.

10. A cell as defined in claim 9 wherein said one of said other terminals of said first MOS device is connected to said gate of said second MOS device and said capacitor includes the parasitic capacitance between said connection and a substrate supporting said cell.

11. A memory unit comprising a capacitive data storing means and first, second, and third switching devices each having an output circuit and a control terminal, the outputs circuits of said second and third switching devices connected in series circuit, said capacitive data storing means connected between the control terminal of said second switching device and a reference potential, the output circuit of said first switching device coupled to the control terminal of said second switching device, and the control terminals of said first and third switching devices directly coupled together and directly coupled to receive a control signal on a selection line, wherein said selection line is one of several selection lines in an array of said storing means.

12. A memory unit as defined in claim 11 in which said switching devices are field effect transistors having a gate electrode defining said control terminal.

13. A memory unit as defined in claim 11 in which said reference potential is the potential of a substrate supporting said unit.

14. A memory unit as defined in claim 11 wherein the output circuit of said first switching device is coupled to receive a write input signal.

15. A memory unit as defined in claim 11 wherein the output circuit of said third switching device is coupled to provide a read output signal and wherein said series circuit is coupled between said read output signal and a second reference potential.

16. An electronic memory storage element comprising a common storage node and a selection line, wherein said selection line is one of several selection lines in an array of said storage elements, said element further comprising:

a. a first transistor including first, second and third electrodes, wherein the first electrode is directly connected to said selection line and the third electrode is connected to said common storage node;

b. a second transistor including first, second and third electrodes, wherein the first electrode is connected to said common storage node; and c. a third transistor including first, second and third electrodes, wherein the first electrode is directly connected to said selection line and wherein the second and third electrodes of said second and third transistors are arranged so that said second and third transistors are connected in series circuit.

17. An element as defined in claim 16 further comprising a bit line coupled to the second electrode of said first transistor.

18. An element as defined in claim 17 wherein said bit line is coupled for writing information into said element.

19. An element as defined in claim 16 further comprising:

a. a bit line;

b. a reference potential; and wherein c. said series circuit is connected between said bit line and said reference potential.

20. An element as defined in claim 19 wherein said bit line is coupled for reading information from said element.

21. An electronic memory storage element having first and second terminal means for connection to a pair of bit lines, a common storage node and third terminal means for connection to a selection line, said memory storage element further being rendered capable of having data read therefrom by a sense amplifier and written thereinto by a digit driver, said element comprising:

a. a first transistor having first, second and third electrodes, wherein the first electrode is directly connected to said third terminal, the second electrode is connected to one of said bit lines and the third electrode is connected to said common storage node;

b. a second transistor having first, second and third electrodes, wherein the first electrode is connected to said common storage node; and c. a third transistor having first, second and third electrodes, wherein the first electrode is directly connected to said third terminal and wherein the second and third electrodes of said second and third transistors are arranged so that said second and third transistors are connected in series between a common reference potential and the other of said bit lines, and wherein the inherent capacitance associated with said common storage node is capable of data storage.

22. An electronic memory storage element as defined in claim 21 wherein said third electrode of said first transistor includes an inherent capacitance associated therewith and said first electrode of said second transistor also includes an inherent capacitance associated therewith, so that said common storage node is adapted to assume either of two voltage ranges indicative of a binary data state.

23. An element as defined in claim 21 wherein each of said first electrodes is a control electrode.

24. An electronic memory element as defined in claim 21 wherein said first, second and third transistors are of the field effect type.

25. An electronic memory storage element as defined in claim 24 further comprising a. a first control point, b. a second control point, c. a fourth transistor having first, second and third electrodes, said first electrode thereof being connected to one of said bit lines, said second electrode thereof being connected to said first control point and said third electrode thereof being connected to the other of said bit lines, and d. a fifth transistor having first, second and third electrodes, said first electrode thereof being connected to said second control point, said second electrode thereof being connected to the second electrode of said fourth transistor and said third electrode thereof being connected to the first electrode of said fourth transistor, c. said fourth and fifth transistors arranged for connection between said bit lines and thereby adapted to provide means for stabilizing the voltages on said bit lines and further adapted to provide means for amplifying a read current.

26. An electronic memory storage element as defined in claim 21 further comprising, a. a read input terminal adapted to receive an activating signal during a read interval, b. a write input terminal adapted to receive an activating signal during a write interval, c. a sense amplifier and a digit driver, d. and fourth and fifth transistors each having first, second and third electrodes, with the first electrodes thereof connected, respectively, to said read input terminal and said write input terminal, the second electrodes thereof coupled, respectively, to said sense amplifier and said digit driver and the third electrodes thereof coupled in common, to one of said bit lines, said fourth and fifth transistors being arranged for sequential selection and connection of said sense amplifier and said digit driver to said bit line.

27. An electronic memory storage element as defined in claim 26 further comprising:

a. a fourth terminal, and b. an sixth transistor having first, second and third electrodes, with the first electrode thereof connected to said fourth selection terminal while the second and third electrodes thereof are interposedly connected between said bit line and the third electrodes of said fourth and fifth transistors.

28. An element as defined in claim 21 further comprising element selection means coupled to said selection line.

29. An element as defined in claim 28 wherein said element selection means is capable of providing a first voltage level during the reading of information from said element and a second voltage level during the writing of information into said element.

* * * * *